M. J. OTTO.
PORTABLE HEATING STOVE.
APPLICATION FILED NOV. 21, 1918.
1,343,578.
Patented June 15, 1920.
2 SHEETS—SHEET 2.
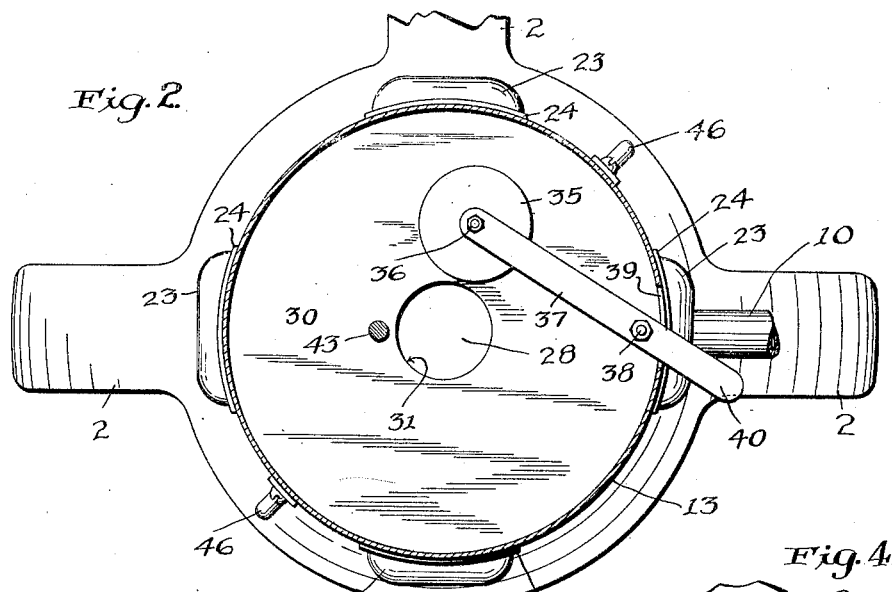
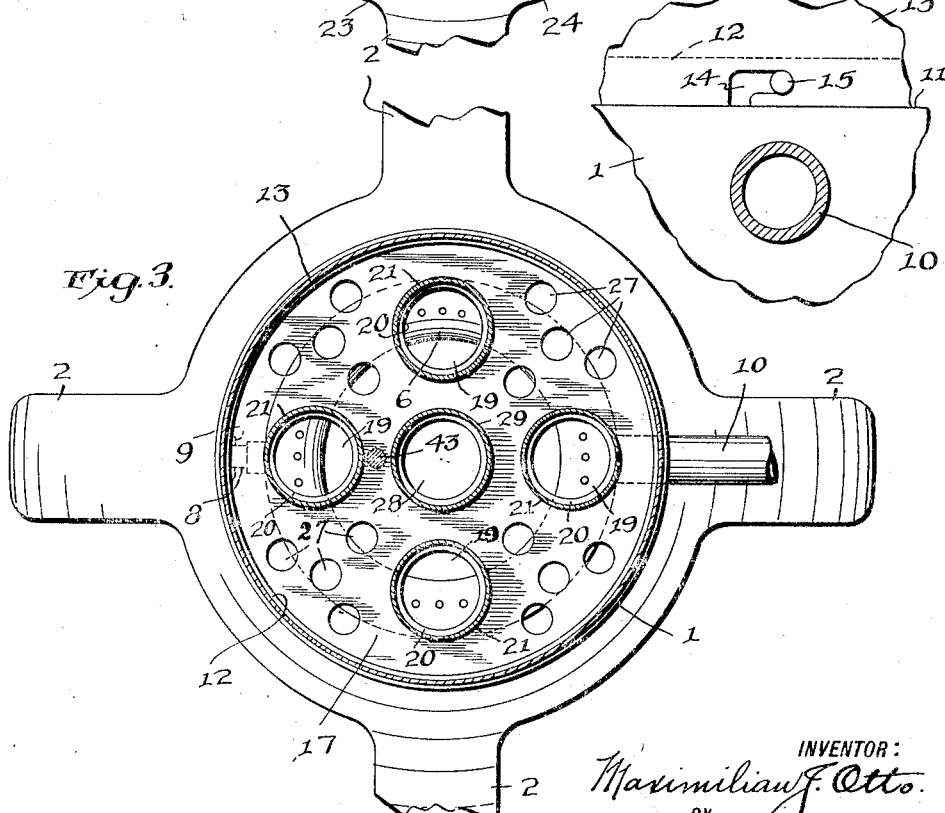
INVENTOR:
Maximilian J. Otto.
BY
Chas. M. Chapman
ATTORNEY.

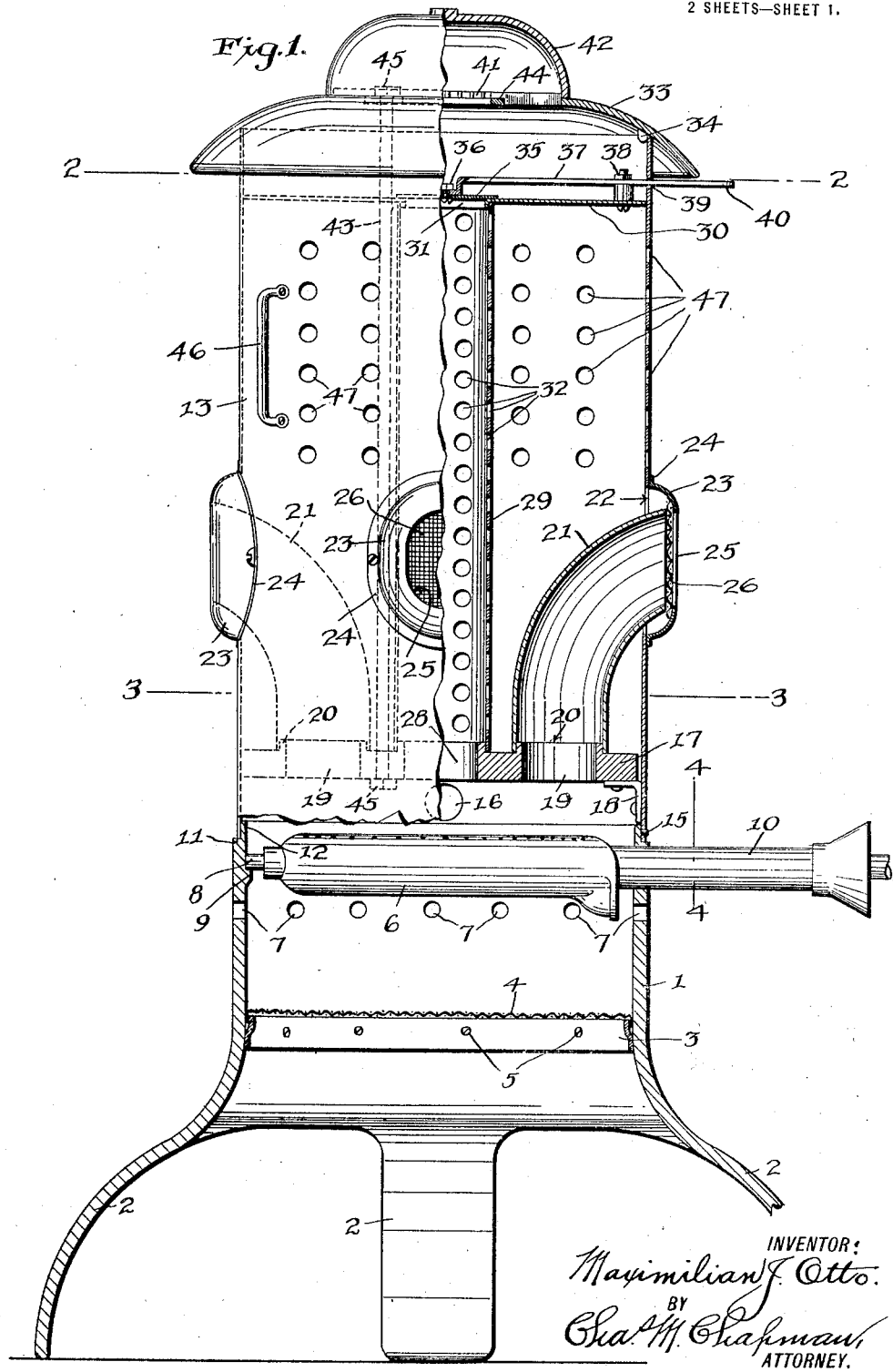

UNITED STATES PATENT OFFICE.

MAXIMILIAN J. OTTO, OF NEW YORK, N. Y.

PORTABLE HEATING-STOVE.

1,343,578.  Specification of Letters Patent.  Patented June 15, 1920.

Application filed November 21, 1918. Serial No. 263,446.

*To all whom it may concern:*

Be it known that I, MAXIMILIAN J. OTTO, a citizen of the United States, residing in the borough of Manhattan, city, county, and State of New York, have invented a new and useful Improvement in Portable Heating-Stoves, of which the following is a description.

This invention has reference to portable heating stoves, and, particularly, to the small, portable, cylinder type adapted to be connected with a source of fuel supply such as gas, oil, etc.

Among the objects of my invention may be noted the following: to provide a heating stove which may also be utilized for cooking purposes to a limited extent, and which is capable of radiating a maximum amount of heat in all directions for a minimum amount of fuel used; to provide a portable stove with a base supporting a burner which, through suitable connections, is adapted to be connected to the source of fuel supply and having a removable heat radiating portion which conveys the heat from the burner in a plurality of different directions so as to thoroughly heat the surroundings; to provide a heater having a base supporting a burner and a detachable top or radiator portion which is portable and capable of being used on other burners, such as cooking stoves, thus enabling the latter to be converted into a heating apparatus, as distinguished from its usual function of cooking; to provide certain simple, inexpensive, effective and strong features of construction working in combination to produce a heating stove which may be converted into a cooking stove for limited uses; and to provide in a heating stove a means by which, after the source of fuel supply has been cut off, there still will be radiated from the stove a sufficient amount of heat for heating purposes in mild weather.

With the above objects in view, and others which will be detailed during the course of this description, my invention consists in the parts, features, elements and combinations thereof hereinafter described and claimed.

In order that my invention may be clearly understood, I have provided drawings wherein:

Figure 1 is a sectional elevation of my stove complete, parts being broken away, showing its various features of construction and improvement;

Fig. 2 is a section taken substantially on the line 2—2 of Fig. 1, looking downwardly, parts being broken away to curtail the figure;

Fig. 3 is a section substantially on the line 3—3 of Fig. 1, looking downwardly, parts being broken away; and Fig. 4 is a section on the line 4—4 of Fig. 1, showing the mode of detachably connecting the cylinder with the base.

Referring to the drawings, the numeral 1 indicates the base of the stove which is provided with a plurality of legs or feet 2 for supporting the same, there being usually four such feet in order to firmly support the stove. The base is cylindrical in form above the feet and is provided with a ring member 3 secured within the same adapted to support or clamp a screen 4 of wire mesh or other suitable material for the purpose of preventing droppings, or explosions at the burner, from causing conflagration on the floor. The screen 4 is clamped between the ring 3 and the cylinder 1 and is thereby held firmly and rigidly in position. Screws 5, or other suitable fastening devices, may be employed for securing the ring 3 to the base 1. At a proper distance above the screen, and just below the burner 6, a plurality of apertures 7 is provided in the base for the admission of air to mix with fuel or proper combustion. The burner 6 is of usual type employed in oil or gas stoves, and, at one side, is supported by means of an extension 8 on a lug or projection 9 made a part of the base. At the other side, the burner has, as usual, a fuel supply pipe 10 detachably screwed thereinto, the same extending, with shield and other usual appliances, to the source of fuel supply. The base may be a casting, or it may be made of sheet metal, or in any other way found suitable, economical and convenient. At its upper end, the base is provided with a laterally extending shoulder 11 affording a seat with upstanding rim 12 for the reception of the lower end of the cylinder 13.

The cylinder 13, which is broadly the heat radiating member, is detachably connected to the base, see Fig. 4, by means of a plurality of bayonet joints, each consisting of an angular, open-end slot 14, at the bottom of the cylinder, adapted to receive a pin or lug 15 secured to the rim 12 of the base. Any number of these bayonet joints may be provided around the circle of the base and cylinder, in order to make a firm and strong connection. They admit of the cylinder being quickly removed from the base by merely turning the former on the latter and lifting it. Near its bottom, the cylinder is provided with an opening 16, through which a match or torch may be extended over the burner to ignite the same when the fuel has been turned on. If any part of the lighted torch falls within the base, it will be caught on the screen 4, as described. Just above the bottom of the cylinder 13, and also above the opening 16, a heat-radiating plate 17 is supported by a plurality of angular brackets 18, the same being secured to the inside of the cylinder and to the bottom of the plate. The plate consists of a heavy casting having a plurality of openings or passages 19 therein, the top of each of which is surrounded by a flange 20 forming a collar for supporting and connecting to the plate a corresponding number of curved, radiating heat conducting flues or pipes 21. Viewing Fig. 3, it will be seen that there are four such pipes extending in four different directions upwardly and outwardly through the wall of the cylinder 13, large apertures 22 in the wall of the cylinder being provided for the passage of the flues. The outer end of the flues 21 is protected around the edge by a cup-shaped shield 23, secured in any suitable manner by a circumferential flange 24 to the outer surface of the cylinder. The shields 23 have a large central opening 25 coextensive with the opening in the end of the flues 21, said opening being screened by wire mesh 26. Thus the flues are protected from the admission of objectionable articles which might purposely or accidentally be thrust thereinto; but, the screen does not impede the full and proper radiation or passage of the heat from the burner 6 through the plate 17. The plate 17, between the several flues 21, is provided with a plurality of apertures 27, Fig. 3, through which heat from the burner may ascend into the body of the cylinder 13 between the several flues. The plate 17 also has a central, flanged opening 28 similar to the flanged openings 19, around which is set a pipe or flue 29 extending from the plate to the diaphragm 30 near the top of the cylinder, the upper end of the said flue 29 being held in position by the downwardly extending flange 31 surrounding an aperture in the diaphragm 30. The flue 29 has a large number of heat radiating apertures or passages 32, throughout its body, see Fig. 1. Thus the central flue 29 conveys heat from the burner and from the plate 17 directly into the body of the cylinder, and said heat may pass entirely through the flue into the chamber at the upper end of the cylinder or under the dome of the latter formed by the convexed, hollow member 33, set on the upper end of the cylinder 13, and there properly held and centered by a plurality of lugs 34. The passage through the upper end of the flue 29 is closed by the damper or slide 35 rigidly fixed by means of a screw 36 to the inner end of lever 37, pivoted at 38 and extending through a slot 39, Fig. 2, in the cylinder 13, and the outer end of which serves as a handle 40 by which the damper 35 may be shifted from the position shown in Fig. 1, closing the upper end of the flue 29, to any one of a series of positions, for example, as shown in Fig. 2, to either entirely uncover the flue passage or close the same to any degree desired, according to the requirements of the user. The dome 33 is provided in its top with a grid 41 upon which may be set any desired utensil, upon removal of the cap 42, which is merely loosely set upon the dome 33, see Fig. 1, the said cap also acting as a top-off or ornament to give the stove a good appearance. In order to hold the dome 33 firmly in position upon the top of the cylinder 13, a rod 43 is passed through the outer ring or flange 44 of the grid 41, through the diaphragm 30 and through the plate 17, beside the central flue 29, and upon the opposite ends of said rod locking nuts 45 are tightly turned, the bottom one against the plate 17 and the top one against the flange 44, thus locking the dome rigidly in place upon the top of the cylinder. The cylinder 13, at opposite points, see Figs. 1 and 2, may have handles 46 secured thereto by which the cylinder may be turned upon the base and lifted therefrom when it is desired, thus enabling the user to remove the upper portion of the stove, or the radiating member thereof, from the base or burner and set said radiating member upon some other burner, as, for example, any one of the several burners of an ordinary cooking stove. Thus the heating member of the stove may be utilized with other burners, without the necessity of detaching the regular burner or base from its source of fuel supply and shifting the same with the cylinder.

The burner 6 may, at any time, be removed from the base by simply unscrewing the pipe 10 from the burner and lifting the latter from the base after the cylinder has been removed. I desire to lay great stress upon the plate 17, which forms a part of my heating or radiating member. This plate is made very heavy or thick and of a material, such as cast-iron, which is capable of being very highly heated and of retaining the heat for a long time and with ability to radiate the same. By this means, in mild weather, or when it is desired to conserve the gas or other fuel, the burner may be set going full-head until the plate 17 is thoroughly heated, when the burner may be either lowered or entirely put out. It will be found that the plate will still radiate an immense amount of heat and furnish all the heat required for a very long time; and the heat will pass directly through the flues and upwardly from the plate into the body of the cylinder, from which latter it is radiated through the apertures 47 in the cylinder body.

When it is desired to use the stove for heating water or for moderate cooking purposes, the cap or cover 42 will be removed and the utensil placed upon the grid 41. The damper 35 will then be shifted by manipulating the lever 37, thus permitting the direct heat through the flue 29 to reach the grid and the bottom of the utensil. Primarily, however, the dome-chamber 33 is filled with heat, the same passing through the flue 29 directly, if the damper 35 be open, and radiating from the diaphragm 30 during the normal operation of the stove. If at any time it is desired to use the burner 6 without the heating or radiating member of the stove, the cylinder 13 can be lifted from the base 1, as described, a grid or spider set upon the upstanding rim 12, and a utensil placed upon the grid. Thus the base becomes a cooking stove readily convertible into a heating stove, by removing the grid and replacing the cylinder.

Having thus described my invention, what I claim and desire to secure by Letters Patent is:

1. A stove comprising a base, a burner supported therein, and a cylindrical heating member detachably supported upon the base, said heating member having a heat absorbing and radiating plate fixed thereto near its bottom in coöperative relation to the burner, and a plurality of heat conveying tubes extending from said plate to its cylindrical wall.

2. A stove comprising a base, a burner supported therein, and a cylindrical heat radiating member supported detachably above the burner, said member supporting within it near its base a heat absorbing and radiating plate provided with a plurality of openings each surrounded by a vertical flange, and a plurality of flues engaged and held by said flanges and extending through the cylindrical member for conveying the heat directly from the plate through the wall of said member.

3. A heating member for gas or liquid fuel burners consisting of a cylinder, a heat radiating plate at the bottom thereof, and a plurality of flues extending from the plate in radial directions through the cylinder.

4. A heating element for gas or liquid fuel burners comprising a cylinder; a heat radiating plate in the bottom thereof; flues extending from the plate through the wall of the cylinder; a flue extending from the plate parallel with the wall of the cylinder; a diaphragm near the top of the cylinder and connecting with the last mentioned flue; and a dome secured to the top of the cylinder.

5. A heating stove comprising a base having a burner; a cylindrical heating member in the form of an inclosing casing detachably secured to the base; an apertured plate supported above the burner within the said member; flues within said member extending from the said plate and connected to the latter and forming passages in continuity with said apertures for conveying the heat to the surroundings within and through the cylindrical member; the heating member having a chamber at its top into which the heat is also conducted.

MAXIMILIAN J. OTTO.